United States Patent [19]
Suzuki et al.

[11] Patent Number: 6,166,468
[45] Date of Patent: Dec. 26, 2000

[54] ROTARY ELECTRIC MACHINE AND BEARING STRUCTURE THEREOF

[75] Inventors: Yuzuru Suzuki; Sakae Fujitani, both of Shizuoka-ken; Kunitake Matsushita, Shizuoka; Takayuki Yamawaki, Shizuoka; Hiroshi Sano, Shizuoka; Kazuo Muramatsu, Shizuoka; Taichi Nishio, Shizuoka, all of Japan

[73] Assignee: Minebea Co., Ltd., Miyota-Machi, Japan

[21] Appl. No.: 09/368,303

[22] Filed: Aug. 3, 1999

[30] Foreign Application Priority Data

Aug. 4, 1998 [JP] Japan ................... 10-220577

[51] Int. Cl.$^7$ ................ H02K 5/15; H02K 5/04
[52] U.S. Cl. ............... 310/90; 310/43; 310/89; 310/91; 310/254
[58] Field of Search ............... 310/90, 42, 89, 310/43, 91, 45, 254

[56] References Cited

U.S. PATENT DOCUMENTS

| | | | |
|---|---|---|---|
| 4,340,830 | 7/1982 | Hoyer-Ellefsen | 310/89 |
| 4,384,226 | 5/1983 | Sato et al. | 310/89 |
| 5,465,020 | 11/1995 | Peterson | 310/194 |
| 5,494,356 | 2/1996 | Strobl | 384/204 |
| 5,783,888 | 7/1998 | Yamano | 310/91 |
| 5,806,169 | 9/1998 | Trago et al. | 310/90 |
| 5,856,718 | 1/1999 | Matsushita et al. | 310/90 |

*Primary Examiner*—Burton Mullins
*Attorney, Agent, or Firm*—Townsend and Townsend and Crew LLP

[57] ABSTRACT

The object of the present invention is to provide a rotary electric machine which has high assembly accuracy, high heat dissipating efficiency, and excellent durability at the bearing portion. A motor comprises a case, a stator secured within the case, and a rotor formed into one piece with a rotary shaft. The case is provided, on both end faces, with flanges, and one of the flanges is provided with a ball bearing. A stator is radially secured within the case, resin is filled in between the stator and the case with a space of the rotor being left, and a bearing housing and a boss are formed on one side. An open portion is formed in between ribs of the bearing housing, and inserting the bearing into the bearing housing causes a part of the bearing to be exposed through the open portion to fixedly contact with the flange. This allows supporting the bearing securely, and allows frictional heat generated, and the like, to dissipate to the outside via the flange. Furthermore, this allows mounting bearings with high accuracy, and reducing noise accompanying mechanical and electromagnetic vibrations.

8 Claims, 7 Drawing Sheets

ROTARY ELECTRIC MACHINE AND BEARING STRUCTURE THEREOF

BACKGROUND OF THE INVENTION

1. Field of the Invention

The present invention relates to a small cylindrical type radial-gap rotary electric machine having improved mounting accuracy of a rotor shaft and heat dissipating efficiency of a bearing and, more particularly, to a rotary electric machine with an armature structure in which a salient pole is formed separately from a stator ring, each salient pole is divided, and a bobbin is used for each salient pole with concentrated winding.

2. Description of the Prior Arts

Generally, an inner rotor type brushless DC motor has a stator portion arranged on the outside thereof, and attached directly on a metallic case or the like, so that heat generated in the motor, especially in the stator portion, is easily dissipated outward through the metallic surface of the stator or is transferred to the case or the like. Thus a good cooling efficiency is provided. The applicant of the present application proposed in Japanese Patent Application No. 178687/1997 an electric machine wherein resin is injected in between a case of the motor and a stator portion to form them into one piece and the resin is also used to form one of the flanges. This proposal brings such advantages that filling of the resin allows the stator to be secured to the case, and flanges for supporting bearings are formed into one piece by the resin filled inside the case to provide improved accuracy of fabrication and increased durability.

However, there was a problem with the foregoing rotary electric machine as above mentioned that flanges for supporting the rotary shaft are formed of resin and, therefore, have insufficient mechanical strength compared with metallic flanges.

For example, in the case where a printing head is driven with a belt looped over a drive shaft of a motor of a printer or the like, increasing belt tension to improve the positioning accuracy of the printing head causes the side pressure applied to the drive shaft to become larger, thereby sometimes resulting in looseness between the shaft and these resin-made flanges due to poor strength for supporting the drive shafts.

Furthermore, resin has lower thermal conductivity compared with metal and thus has such a disadvantage that heat generated in the resin is less prone to being transferred to the outside. That is, a problem arises when flanges are formed of resin and bearings are covered with resin, because heat generated in the bearings is liable to be captured, thus resulting in an increase in the bearing temperature. Furthermore, increasing the thickness of the resin to raise the mechanical strength of the flanges causes the amount of resin used to increase, and accordingly causes the size, the weight and the cost of the motor to increase, and causes the heat resistance and temperature to increase as well.

Accordingly, in the foregoing example, heat is not transferred to the case surface or the like via the flanges whereby temperature at the bearings supported by the flanges increase extraordinarily during operation. In general, it is known that the life of bearings reduces significantly as the temperature increases during operation. Considering the life of a rotary electric machine, the heat dissipating efficiency of a bearing is as important as the heat dissipating efficiency of the stators.

As mentioned above, in the inner rotor type brushless DC motor that is said to have good heat dissipating efficiency and high durability, it is very important to improve heat dissipating efficiency at the bearing portion in increasing the life of a whole motor. In this sense, the proposal made in Japanese Patent Application No. 178687/1997 has an improved aspect in which flange portions are formed of a resin having low thermal conductivity or high heat resistance.

SUMMARY OF THE INVENTION

It is an object of the present invention to solve the foregoing problems and provide a rotary electric machine with the armature portion including a case of the electric machine formed by filling with resin and with the bearings fixedly inserted into a resin-made bearing housing, wherein heat generated in the bearing portions is efficiently transferred to the outside while maintaining high mounting accuracy of the bearing portions whereby high durability is available.

According to the present invention, a rotary electric machine is constituted as mentioned below in order to solve the foregoing problems.

The cylindrical type radial-gap rotary electric machine comprises an substantially cylindrical metallic case, a stator yoke with salient poles radially disposed, a rotor having a permanent magnet, a metallic bearing for supporting the rotor, and metallic flanges provided on the end faces of the case for supporting the bearing;

wherein resin is injected in between a stator yoke and the case to form them into one piece, and a bearing housing and a fitting boss portion for mounting a motor are formed continuously of the resin on one end of the case.

This allows simplification of assembly work and improvement of the mounting accuracy of a motor. The bearing in the foregoing is not limited to a ball bearing but can be any other type of bearing. Additionally, the boss portion is not necessarily required. Furthermore, the bearing housing is not limited to one in which the bearing is fixedly inserted from the inside of the case but may be one in which it is inserted from the outside. Still furthermore, the bearing may be embedded into the bearing housing at the time of injection molding.

The rotary electric machine is constructed such that an opening portion is formed in the bearing housing so that inserting the bearing into the bearing housing causes a part of the outer circumferential portion of the bearing to be exposed and that part of the bearing to be fit-contacted on the inner face of a metallic flange.

Accordingly, this allows the mounting strength of bearing to be improved, frictional heat generated in the bearing to dissipate efficiently to the outside of the rotary electric machine, and cooling capability to be improved to increase the bearing life.

The rotary electric machine has ribs in a radial pattern at the bearing housing portion and a plurality of open windows between these ribs. This causes the bearing support portions of a flange to come into a fit-contact via the open window, whereby the concentric accuracy of mounting a motor can be maintained at a high level, and at the same time the mechanical strength of the bearing housing and cooling capability can be improved.

In the rotary electric machine, a bearing housing thereof is provided on the side where an external load is exerted. Especially, a bearing having a high mechanical strength is arranged on the side where a large external force is exerted, and good heat dissipating efficiency is arranged. This allows for providing a rotary electric machine with high accuracy and high durability that is capable of withstanding a heavy load.

The rotary electric machine is directed to an inner rotor brushless DC motor wherein a bearing housing and a mounting boss both of which are formed into one piece are provided on the side of the output shaft of the motor and a flange is mounted onto the bearing inside the bearing housing, and a drive belt is looped over the output shaft for use. This allows raise in the mechanical strength of the bearing side which is subject to a direct external force (side pressure) and increase in the heat dissipating efficiency of the bearing, thereby allowing highly durable and reliable rotary electric machine.

Power of a motor may be transmitted not by means of a drive belt but by means of a chain or the like.

DETAILED DESCRIPTION OF THE PREFERRED EMBODIMENTS

A bearing structure of a rotary electric machine according to the present invention and an embodiment of the rotary electric machine will be explained below by taking a motor as an example.

Figure 1:
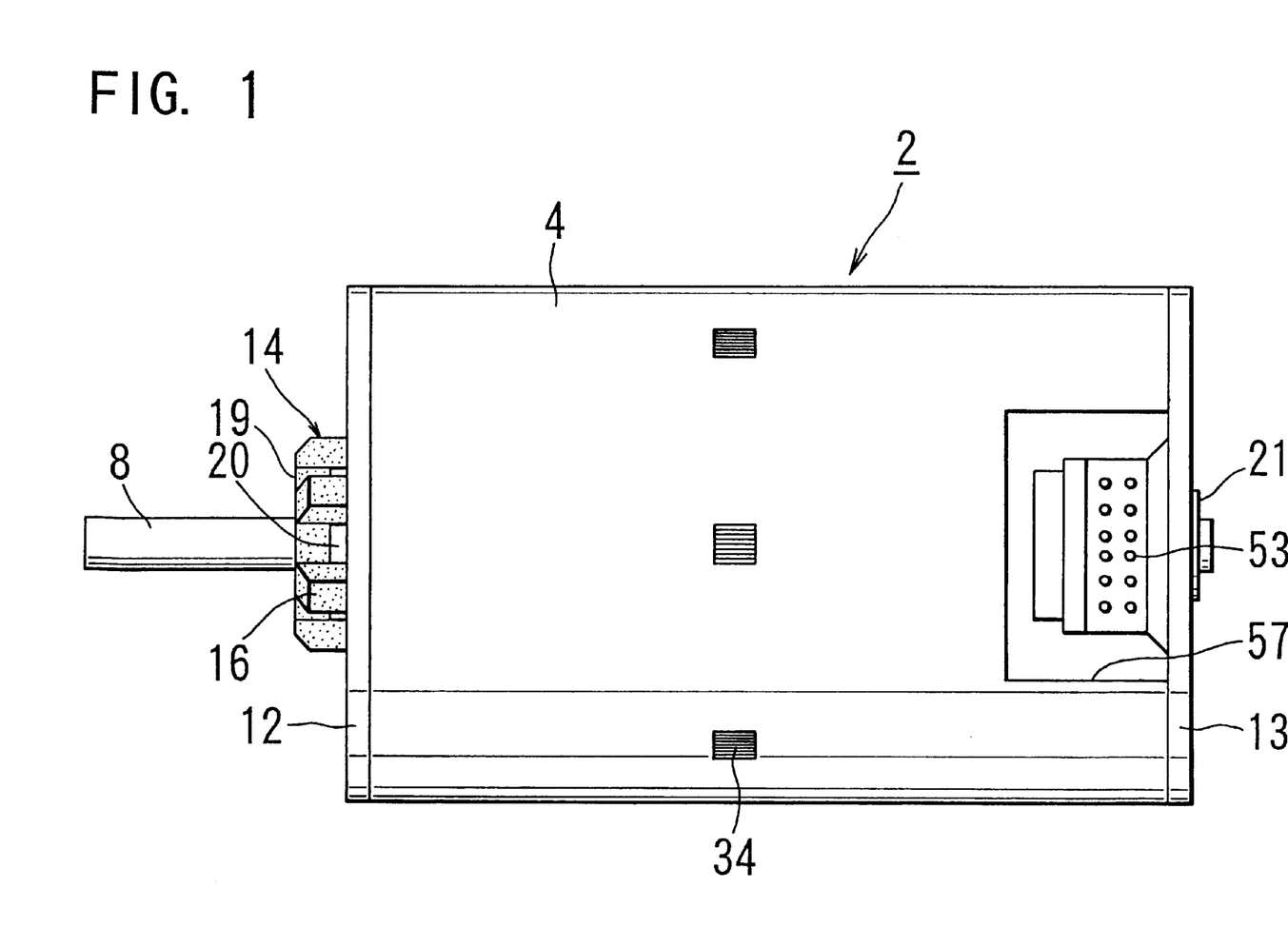
FIG. 1 shows an outer appearance of an embodiment of a motor according to the present invention.
Figure 2:
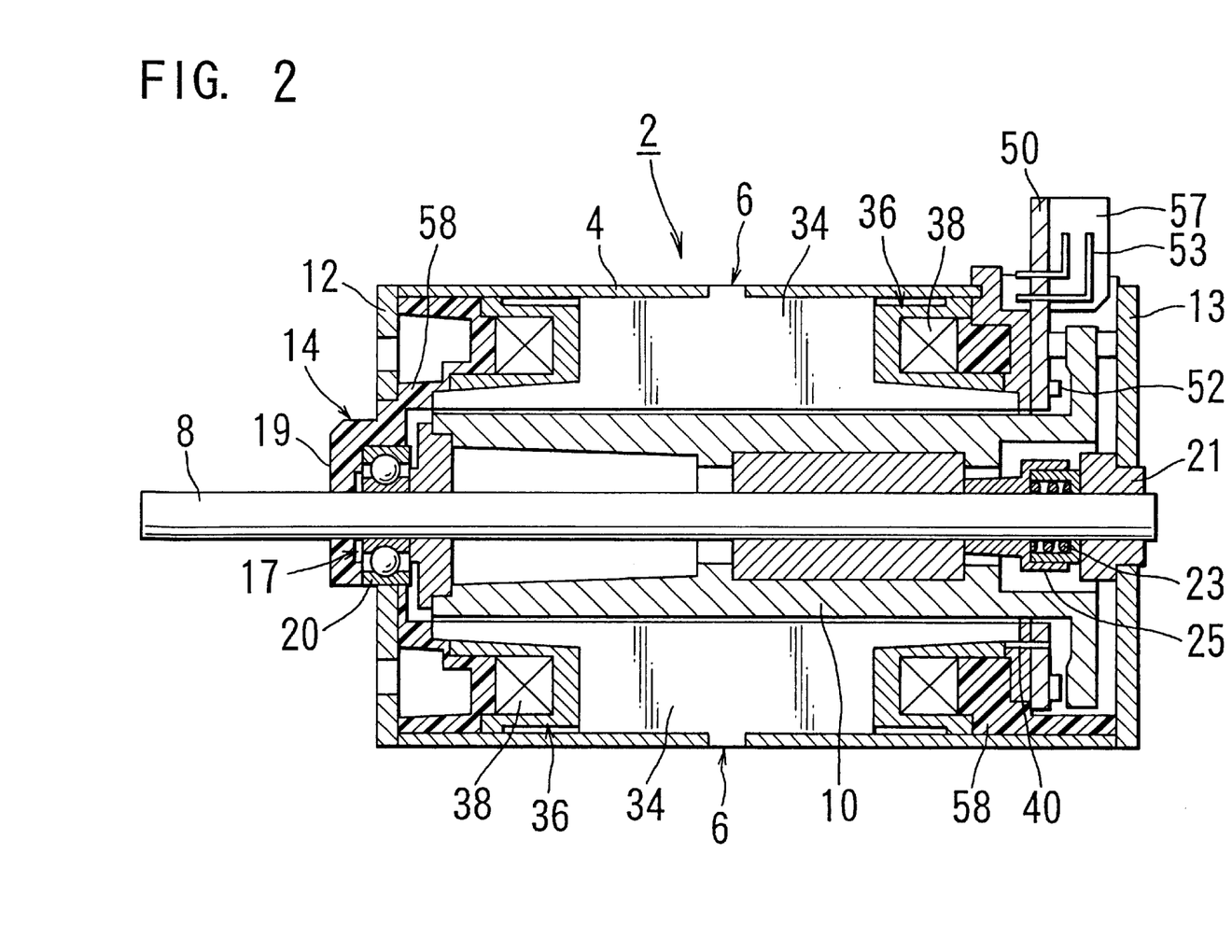
FIG. 2 is a cross-sectional view of the motor shown in FIG. 1.

FIG. 1 shows the outer appearance of a motor 2 which is a 3-phase inner rotor type brushless DC motor having 6 salient poles and 8 rotor field poles; FIG. 2 shows a cross section in the axial direction of the motor 2.

The motor 2 comprises a case 4, a stator 6 secured within the case 4, and a rotor 10 built into one piece with a rotary shaft 8.

The case 4 is made of metal, has a substantially cylindrical shape, and is provided with flanges 12 and 13 on both end faces thereof. The flange 12, shown on the left in the drawing, is provided with a ball bearing 20 with the rotary shaft 8 extending, while the flange 13 on the other side is provided with a sleeve bearing 21 for supporting the other end of the rotary shaft 8.

The rotor 10 comprises the rotary shaft 8, a rotor magnet with eight rotor field poles, and a sleeve, and is rotatably supported by bearings 20 and 21. Furthermore, the rotor 10 is provided with a spring holder 25 and a spring 23, whereby the rotor 10 is adequately positioned in the axial direction thereof and the pre-load onto the bearing 20 is adequately set.

Figure 5:
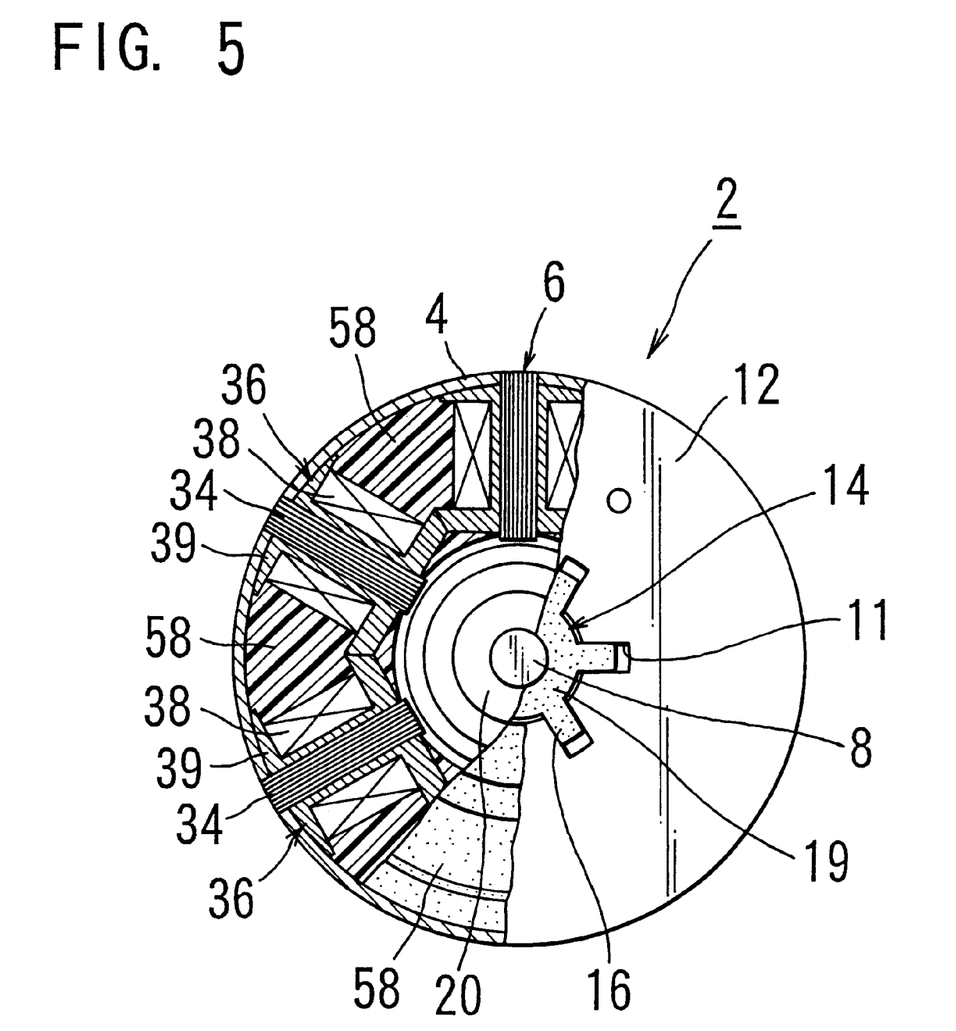
FIG. 5 is a view showing one end of the motor shown in FIG. 1.
Figure 6:
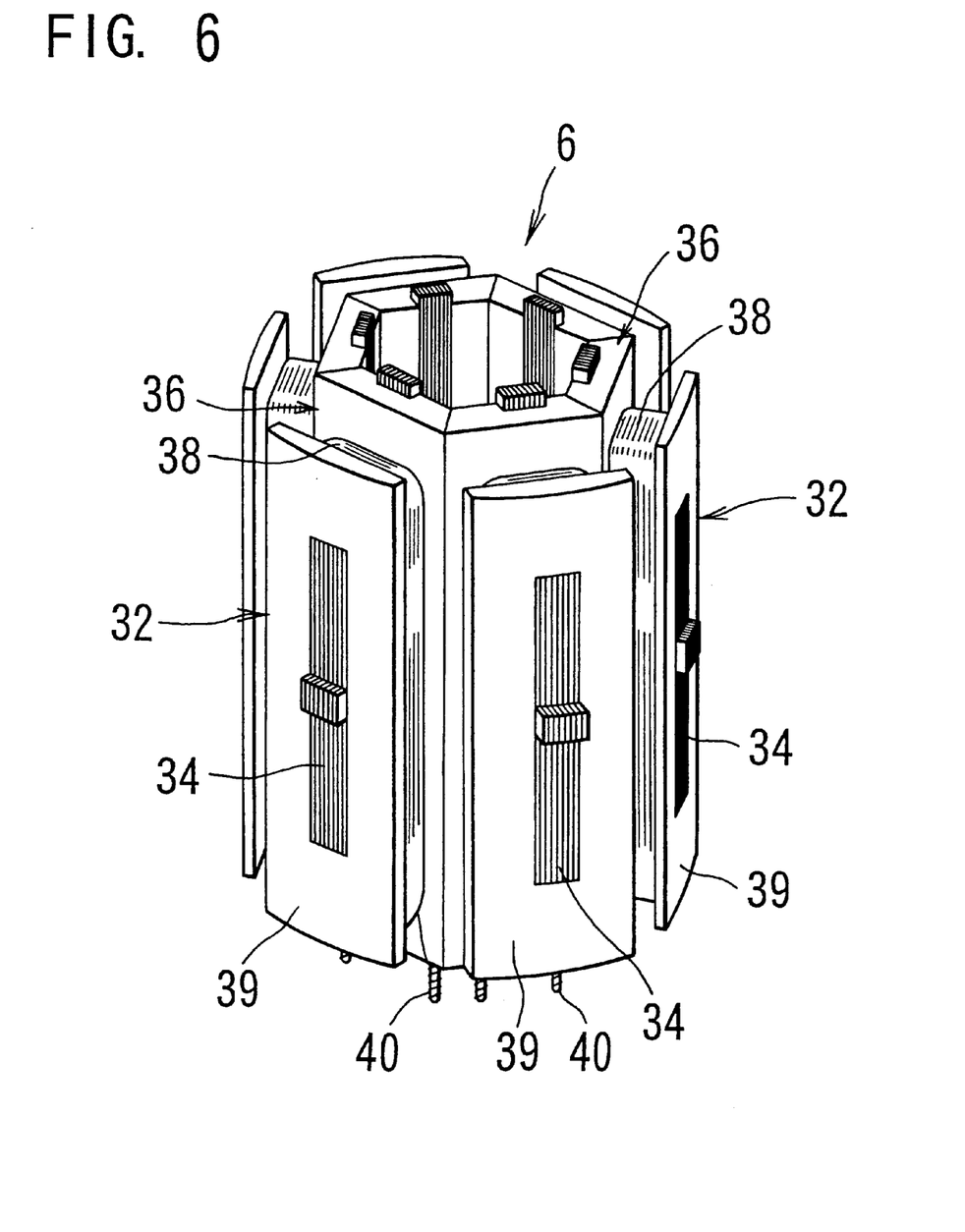
FIG. 6 is a perspective view showing an embodiment of a stator according to the present invention.
Figure 7:
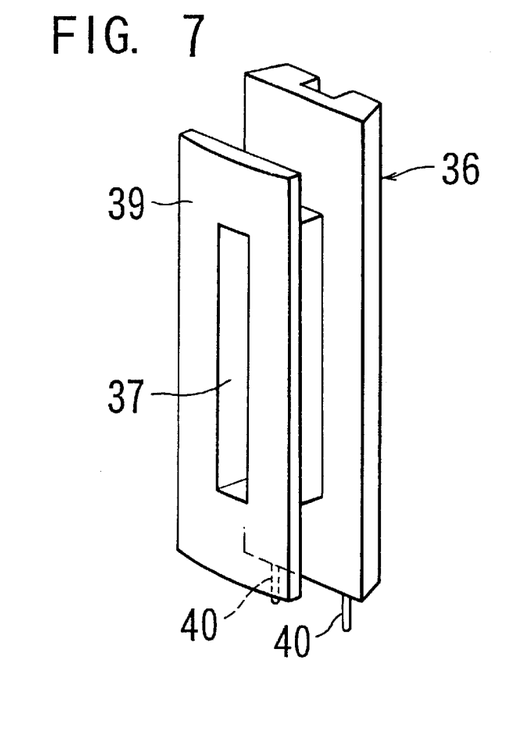
FIG. 7 is a perspective view showing a bobbin of the motor according to the present invention.

As shown in FIG. 5 and FIG. 6, the stator 6 comprises six stator yokes 32 and is secured radially inside the case 4. Each stator yoke 32 comprises a salient pole 34, a bobbin 36 for supporting the salient pole 34, and a magnet wire 38 wound around the bobbin 36.

Figure 8:
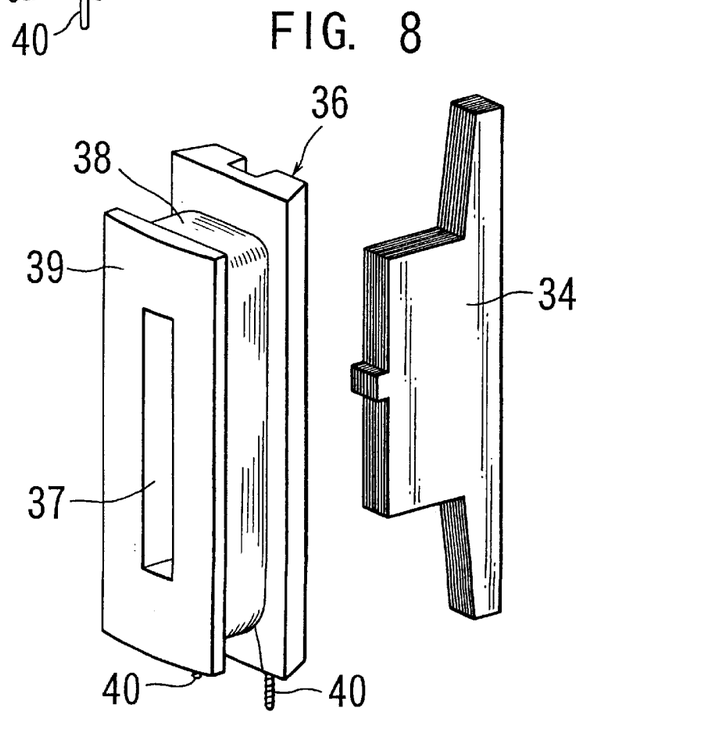
FIG. 8 is an exploded view showing an embodiment of a stator according to the present invention.

As shown in FIG. 8, the salient pole 34 comprises nine pieces of electromagnetic steel plates, each having a thickness of 0.35 mm, punched into a shape like letter T and laminated in parallel to the shaft. The narrowly formed portion of a shape T of the salient pole 34 is inserted into a rectangular hole 37 of the bobbin 36, while the other elongated portion is so arranged as to project slightly from the bobbin 36 toward the rotary shaft 8. The salient pole 34 may be laminated in the axial direction so as to be inserted into the rectangular hole 37.

The bobbin 36 which is made of resin, has a collar 39 and a rectangular hole 37, and is provided with a magnet wire 38 wound around the outer circumference of the rectangular hole 37. The bobbin 36 is provided, on the lower end portion thereof, with terminals 40 at which the magnetic wire 38 is tied up at the end thereof. The end of the magnet wire 38 thus is tied up at the terminals 40 and is then soldered. FIG. 6 shows six stator yokes 32 circumferentially arranged. The salient pole 34 faces the rotor 10 via a small air gap when the rotor 10 is inserted. The whole is arranged and secured on the inner circumference of the case 4.

As shown in FIG. 2, the terminals 40 at which the magnet wire 38 is tied up is connected to a printed circuit board 50 wherein given electric circuits and electronic parts are mounted. The printed circuit board 50 is electrically insulated from the case and arranged on an end of the case 4 substantially in parallel to the flange 12. The printed circuit board 50 comprises three hall sensors 52 adapted to detect rotor field poles of the rotor 10 together with the electric circuit, and is connected to a connector 53 for external connection. This allows providing information on the position of the rotor 10 via the connector 53 and the rotor 10 to rotate by exciting each phase on the basis of the position information of the hall sensors 52. A pin holder 57 is made of resin for protecting the connector 53.

As shown in FIG. 5, resin 58 is injected inside the case 4 of the motor 2. The resin 58 is filled in between the stator 6 and the case 4, leaving a space at the center for inserting the rotor 10. Furthermore, the resin 58 is used for forming a bearing housing 14 and a boss portion 19 on one side of the motor 2.

The bearing housing 14 will now be explained in detail with reference to the drawings.

Figure 3:
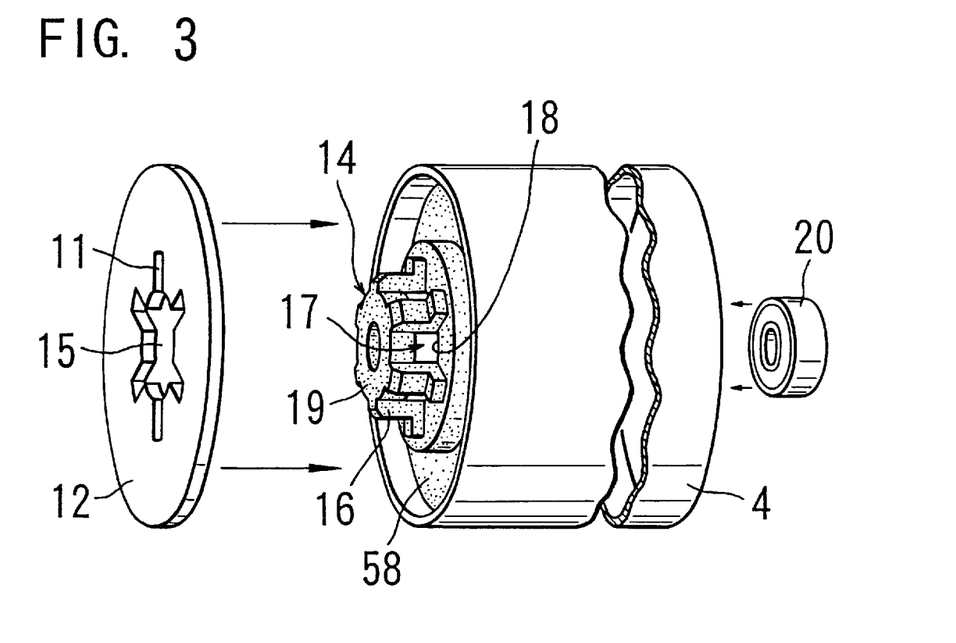
FIG. 3 is an exploded view of the motor shown in FIG. 1.
Figure 4:
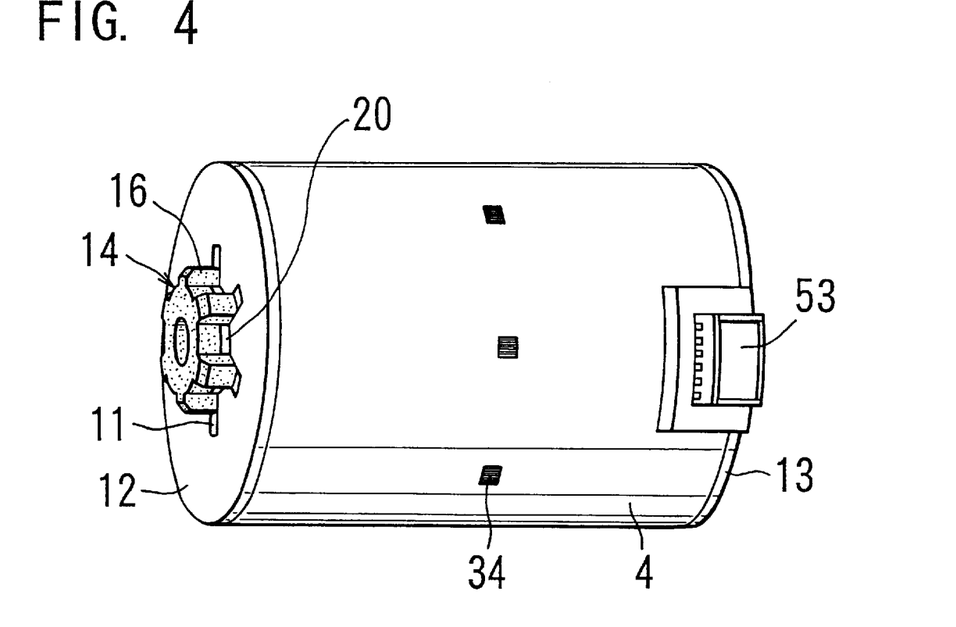
FIG. 4 is a perspective of the motor shown in FIG. 1.

FIG. 3 is a perspective view for easy understanding of assembly of the motor 2, and FIG. 4 is a perspective view of the assembled motor 2. The bearing housing 14 covers almost the whole of one end of the case 4, and, at the center thereof, has a bearing holding portion 17 for supporting the boss portion 19 and the bearing 20. The boss portion 19 is provided with ribs 16 that project from the end face of the case 4 to extend equally outwards at six points. The bearing holding portion 17 is formed inside the boss 19 so as to be equal to the outer diameter of the bearing 20 in order to secure the bearing 20.

Furthermore, the bearing holding portion 17 is provided with an open portion 18 which is formed between two adjacent ribs 16. When the bearing 20 is inserted into the bearing holding portion 17 as shown in FIG. 3, a part of the bearing 20 will expose through the open portion 18 of the bearing housing 14.

On the other hand, as shown in FIG. 3, the flange 12 made of a circular metallic plate is provided at the center with a center hole 15 whose contour is equal to the outer circumference of the bearing 20 and a slit 11 intended to avoid the rib 16.

Therefore, as shown in FIG. 3, when the bearing 20 is inserted into the bearing housing 14 and the flange 12 is assembled onto the boss 19, the bearing will be fixedly inserted into the bearing holding portion 17 and the inner side of the center hole 15 of the flange 12 will contact with the bearing 20 exposed through the open portion 18 of the bearing housing 14. FIG. 4 shows the flange 12 assembled on the motor 2.

Accordingly, direct contact of the inner side of the flange 12 with the bearing 20 allows firm securing of the bearing 20 and dissipation of heat outwards which is generated by friction via the flange 12 as well. Furthermore, integral formation of the bearing housing 14 allows high mounting accuracy of the bearing 20 for reduction of noise accompanied by mechanical and electromagnetic vibration.

Another embodiment of the rotary electric machine will be explained. In the foregoing embodiment, the rib 16 is completely opened to provide portion 18, however, in this embodiment, an extremely thin layer of resin is formed at the afore-mentioned open portion 18 so as not to form an open portion at the bearing housing 14. This causes a resin layer to intervene between the bearing 20 and the flange 12, thereby reducing vibration, noise or the like of the bearing 20 which may generate as the rotary shaft 8 rotates and allowing electrical insulation between the rotary shaft 8 from the flange 12. Although the resin layer slightly reduces the cooling capability for the bearing 20, making the thickness of the resin layer equal to or less than 0.5 mm (preferably equal to or less than 0.3 mm) will not cause a practical problem in heat dissipation.

Next, a third embodiment will be explained.

In the third embodiment, the three-phase inner rotor type brushless DC motor having six salient poles and eight rotor field poles, according to the present invention, is driven with a belt.

Figure 9:
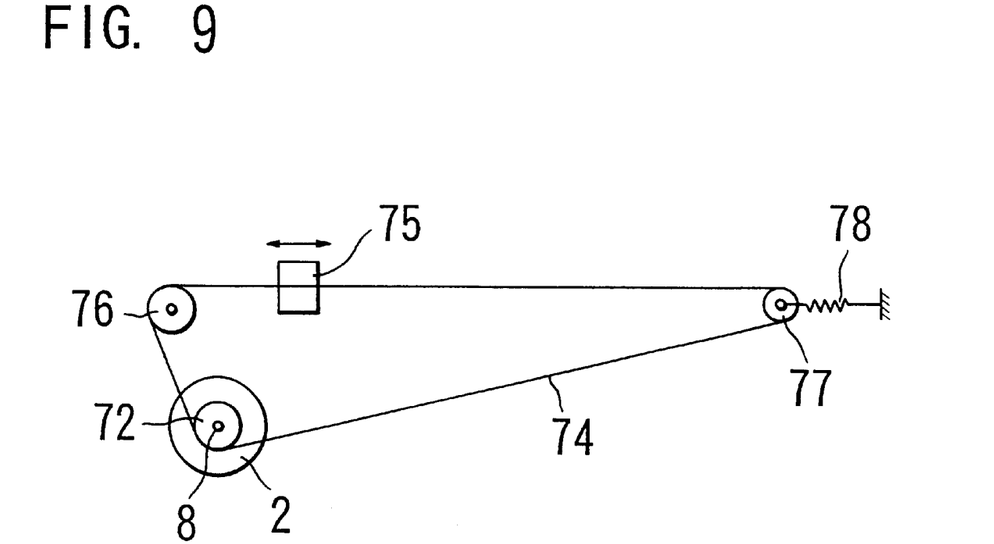
FIG. 9 is a view showing how to drive a motor according to the present invention.

As shown in FIG. 9, a pulley 72 is secured to the rotary shaft 8 of the motor 2, a toothed belt 74 is looped over the pulley 72, and the toothed belt 74 drives a head 75. The toothed belt 74 is looped over the pulley 72, and driven pulleys 76 and 77. The driven pulley 77 is pulled outward with a spring 78 so that a given tension is applied to the toothed belt 74.

With a driving mechanism constituted with the above-mentioned motor 2, high positioning accuracy of the rotary shaft 8 is provided, fabrication becomes easy and good heat dissipation is obtained, thereby realizing a highly durable drive mechanism.

The foregoing embodiments have been explained by way of motor as an example, however, the bearing structure of the rotary electric machine according to the present invention and the rotary electric machine are not limited to a motor. In addition, the salient pole 34 may not be laminated in parallel to the axial direction of the rotary shaft 8 but may be laminated sequentially in the axial direction as performed in the conventional manner. That is, the present invention is applicable to all types of rotary electric machines having a structure wherein the bearing housing is formed into one piece by filling the armature portion with resin and a metallic flange is allowed to contact with the bearing to improve the strength of the bearing and heat dissipation.

According to the present invention, resin is filled between a stator and a case, the resin forms the bearing housing, and the bearing is attached with a metallic flange, whereby a bearing structure of a rotary electric machine is provided which can be easily assembled and has high durability.

Furthermore, a part of the bearing is contacted with a flange so that heat generated on the bearing can be dissipated outside of the rotary electric machine via a metallic flange, whereby a rotary electric machine with excellent heat dissipation efficiency can be provided. In particular, the heat dissipation efficiency at the bearing portion is improved, and thus a long-life and a highly reliable inner rotor brushless motor is provided.

What is claimed is:

1. A cylindrical radial-gap rotary electric machine comprising:
   a cylindrical metallic case;
   a stator yoke radially disposed on an inner face of the cylindrical metallic case, resin being filled in a portion between the cylindrical metallic case and the stator yoke;
   a rotor rotatably disposed at a center of the stator yoke;
   a metallic flange disposed on at least one end of the cylindrical metallic case;
   a bearing structure including a bearing housing for supporting a bearing of the rotor, the bearing housing being formed continuously with the resin in the portion where the resin is filled,
   wherein the bearing housing has an open portion on an outer circumferential portion of a support portion for supporting the bearing, and wherein inserting the bearing into the bearing housing allows the outer circumference of the bearing to contact with the flange via the open portion.

2. The cylindrical radial-gap rotary electric machine of claim 1 wherein the bearing housing has radial ribs extending outward and the open portion is formed at the root of the ribs, wherein the flange includes a hole having a diameter equal to an outer diameter of the bearing and notches at the center for avoiding the ribs, and wherein attaching the flange to the case causes the bearing to come into contact with the flange via the open portion.

3. A cylindrical radial-gap rotary electric machine comprising:
   a cylindrical metallic case;
   a stator yoke radially disposed on an inner face of the cylindrical metallic case, resin being filled in a portion between the cylindrical metallic case and the stator yoke;
   a rotor rotatably disposed at a center of the stator yoke;
   a metallic flange disposed on at least one end of the cylindrical metallic case;
   a bearing structure including a bearing housing for supporting a bearing of the rotor, the bearing housing being formed continuously with the resin in the portion where the resin is filled,
   wherein the bearing housing is disposed on a side where an external load of the rotary electric machine is connected, and wherein the rotary electric machine is an inner rotor type brushless DC motor, a drive mechanism being constituted by providing the bearing housing and a fitting boss for mounting the motor on the side of an output shaft of the motor, a connecting element on the output shaft, and a transmitting member to the connecting element.

4. A cylindrical radial-gap rotary electric machine comprising:
   a cylindrical metallic case;
   a stator yoke radially disposed on an inner face of the cylindrical metallic case, resin being filled in a portion between the cylindrical metallic case and the stator yoke;
   a rotor rotatably disposed at a center of the stator yoke;

a metallic flange disposed on at least one end of the cylindrical metallic case;

a bearing structure including a bearing housing for supporting a bearing of the rotor, the bearing housing being formed continuously with the resin in the portion where the resin is filled, wherein the bearing housing has an open portion on an outer circumferential portion of a support portion for supporting the bearing, wherein inserting the bearing into the bearing housing allows the outer circumference of the bearing to contact with the flange via the open portion, and wherein the bearing housing is disposed on a side where an external load of the rotary electric machine is connected.

5. The cylindrical radial gap rotary electric machine of claim 4 wherein the bearing housing has radial ribs extending outward and the open portion is formed at the root of the ribs, wherein the flange includes a hole having a diameter equal to an outer diameter of the bearing and notches at the center for avoiding the ribs, and wherein attaching the flange to the case causes the bearing to come into contact with the flange via the open portion.

6. The cylindrical radial gap rotary electric machine of claim 4 wherein the rotary electric machine is an inner rotor type brushless DC motor, a drive mechanism being constituted by providing the bearing housing and a fitting boss for mounting the motor on the side of an output shaft of the motor, a connecting element on the output shaft, and a transmitting member to the connecting element.

7. A cylindrical radial-gap rotary electric machine comprising:

a cylindrical metallic case;

a stator yoke radially disposed on an inner face of the cylindrical metallic case, resin being filled in a portion between the cylindrical metallic case and the stator yoke;

a rotor rotatably disposed at a center of the stator yoke;

a metallic flange disposed on at least one end of the cylindrical metallic case;

a bearing structure including a bearing housing for supporting a bearing of the rotor, the bearing housing being formed continuously with the resin in the portion where the resin is filled, wherein the bearing housing has an intervening portion on an outer circumferential portion of a support portion for supporting the bearing, the intervening portion including a resin layer, and wherein inserting the bearing into the bearing housing allows the resin layer of the intervening portion to be disposed between and in contact with the outer circumference of the bearing and the flange.

8. The cylindrical radial-gap rotary electric machine of claim 7 wherein the bearing housing has radial ribs extending outward and the intervening portion is formed at the root of the ribs, wherein the flange includes a hole having a diameter equal to an outer diameter of the bearing and notches at the center for avoiding the ribs, and wherein attaching the flange to the case causes the bearing to come into contact with the resin layer of the intervening portion which is disposed between the bearing and the flange.

* * * * *